United States Patent
Yasui et al.

(10) Patent No.: US 10,723,646 B2
(45) Date of Patent: Jul. 28, 2020

(54) ORGANIC WASTEWATER TREATMENT METHOD AND ORGANIC WASTEWATER TREATMENT DEVICE

(71) Applicants: METAWATER CO., LTD., Tokyo (JP); THE UNIVERSITY OF KITAKYUSHU, Kitakyushu-shi, Fukuoka (JP)

(72) Inventors: Hidenari Yasui, Kitakyushu (JP); Mitsuharu Terashima, Kitakyushu (JP); Tetsuya Yanase, Tokyo (JP); Natsumi Noiri, Tokyo (JP)

(73) Assignees: METAWATER CO., LTD., Tokyo (JP); THE UNIVERSITY OF KITAKYUSHU, Kitakyushu-shi, Fukuoka (JP)

( * ) Notice: Subject to any disclaimer, the term of this patent is extended or adjusted under 35 U.S.C. 154(b) by 0 days.

(21) Appl. No.: 16/328,989

(22) PCT Filed: Jul. 28, 2017

(86) PCT No.: PCT/JP2017/027403
§ 371 (c)(1),
(2) Date: Feb. 27, 2019

(87) PCT Pub. No.: WO2018/042972
PCT Pub. Date: Mar. 8, 2018

(65) Prior Publication Data
US 2019/0194050 A1 Jun. 27, 2019

(30) Foreign Application Priority Data
Sep. 2, 2016 (JP) .................................. 2016-172266

(51) Int. Cl.
*C02F 9/00* (2006.01)
*C02F 3/12* (2006.01)
(Continued)

(52) U.S. Cl.
CPC ................. *C02F 9/00* (2013.01); *C02F 1/008* (2013.01); *C02F 3/006* (2013.01); *C02F 3/12* (2013.01);
(Continued)

(58) Field of Classification Search
CPC .. C02F 9/00; C02F 11/18; C02F 3/006; C02F 1/008; C02F 11/12; C02F 11/04;
(Continued)

(56) References Cited

U.S. PATENT DOCUMENTS

| 5,417,861 A * | 5/1995 | Burnham .................. C02F 1/66 210/609 |
| 5,723,048 A | 3/1998 | Kobayashi et al. |
| 2003/0217968 A1* | 11/2003 | Goel ..................... C02F 3/1221 210/605 |

FOREIGN PATENT DOCUMENTS

| JP | 55-157390 A | 12/1980 |
| JP | 56-167000 A | 12/1981 |

(Continued)

OTHER PUBLICATIONS

Machine-generated English translation of JP 2012-192351, dated Dec. 7, 2019.*

(Continued)

*Primary Examiner* — Fred Prince
(74) *Attorney, Agent, or Firm* — Sughrue Mion, PLLC

(57) ABSTRACT

An organic wastewater treatment method that includes a raw sludge removal step, a raw sludge concentration step, a biological treatment step, an excess sludge separation step, an excess sludge concentration step, a sludge mixing step, and a methane fermentation treatment step. The treatment method further includes a sterilization step for heating and sterilizing the concentrated excess sludge upstream of the sludge mixing step. At least one among: (1) the temperature
(Continued)

to which the concentrated excess sludge is heated during sterilization, (2) the concentration of concentrated raw sludge and/or the concentration of the concentrated excess sludge, and (3) the mixture ratio between the concentrated raw sludge and the concentrated excess sludge is adjusted according to the fluctuation in the amount of raw sludge generated and the amount of the excess sludge generated, and the temperature of the mixed sludge is controlled to a temperature suited for methane fermentation.

10 Claims, 5 Drawing Sheets

(51) Int. Cl.
*C02F 11/04* (2006.01)
*C02F 11/12* (2019.01)
*C02F 3/00* (2006.01)
*C02F 11/18* (2006.01)
*C02F 1/00* (2006.01)

(52) U.S. Cl.
CPC .............. *C02F 11/04* (2013.01); *C02F 11/12* (2013.01); *C02F 11/18* (2013.01); *C02F 11/185* (2013.01); *C02F 2209/003* (2013.01); *C02F 2209/02* (2013.01); *C02F 2209/40* (2013.01); *C02F 2301/10* (2013.01); *C02F 2303/04* (2013.01); *C02F 2303/06* (2013.01); *Y02W 10/15* (2015.05)

(58) Field of Classification Search
CPC .. C02F 3/12; C02F 2209/003; C02F 2303/06; C02F 2303/04; C02F 2301/10; C02F 2209/40; C02F 11/185; C02F 2209/02; Y02W 10/15
USPC ........ 210/603, 607, 608, 609, 612, 614, 259
See application file for complete search history.

(56) References Cited

FOREIGN PATENT DOCUMENTS

| | | | |
|---|---|---|---|
| JP | 57-107299 | A | 7/1982 |
| JP | 59-136196 | A | 8/1984 |
| JP | 8-238499 | A | 9/1996 |
| JP | 2007-21367 | A | 2/2007 |
| JP | 2011-206667 | A | 10/2011 |
| JP | 2012-192351 | A | 10/2012 |
| JP | 5441787 | B2 | 3/2014 |
| JP | 2016-140862 | A | 8/2016 |

OTHER PUBLICATIONS

International Search Report for PCT/JP2017/027403 dated Oct. 10, 2017 [PCT/ISA/210].
International Preliminary Report on Patentability with English Translation of Written Opinion of the International Searching Authority for PCT/JP2017/027403 dated Mar. 5, 2019.
Communication dated Jun. 12, 2019 from European Patent Office in counterpart EP Application No. 17845981.4.

* cited by examiner

ORGANIC WASTEWATER TREATMENT METHOD AND ORGANIC WASTEWATER TREATMENT DEVICE

CROSS REFERENCE TO RELATED APPLICATIONS

This application is a National Stage of International Application No. PCT/JP2017/027403, filed on Jul. 28, 2017, which claims priority from Japanese Patent Application No. 2016-172266, filed on Sep. 2, 2016.

TECHNICAL FIELD

The present invention relates to an organic wastewater treatment method and an organic wastewater treatment device for performing a biological treatment on organic wastewater such as sewage, mixing raw sludge obtained before the biological treatment and excess sludge generated after the biological treatment, and subjecting the mixed sludge to methane fermentation.

BACKGROUND ART

One example of a method for treating organic wastewater such as sewage involves removing the raw sludge (primary sludge) from the organic wastewater followed by a biological treatment such as an activated sludge treatment, thereafter removing excess sludge from the biologically treated organic wastewater while the solution being discharged, the raw sludge and the excess sludge is mixed and subjected to methane fermentation treatment, so as to reduce the volume of the sludge.

Due to containing more easily degradable organic matter than excess sludge does, raw sludge is more adaptable to methane fermentation in aspects of digestive efficiency, amount of digestion gas generated, digestion speed, etc. able to yield a higher energy recovery effect. Conversely, excess sludge is a kind of substrate rich in hard-to-degrade cellulose and proteins derived from such as microbial cells, which requires time to get decomposed. Therefore it has a lower energy recovery effect than raw sludge does. Because of that when a mixture of raw sludge and excess sludge is subjected to methane fermentation, the performance of methane fermentation gets worse, resulting in poor energy recovery efficiency and larger methane fermentation tanks in order to obtain long hydraulic retention time.

In order to improve the property of such excess sludge, technologies for example solubilization treatment were developed. Patent document 1 discloses a method for treating organic wastewater, which includes a primary sludge removal step, an activated sludge treatment step, an excess sludge removal step, and a methane fermentation treatment step with the primary sludge and the excess sludge, where the excess sludge being subjected to a solubilization treatment at 60-90° C., heat from the solubilization-treated excess sludge was utilized to heat the primary sludge, the heated primary sludge was subjected to an acid fermentation treatment for 3-4 days at 30-40° C., and then mixed with the solubilization-treated excess sludge for methane fermentation treatment.

PRIOR ART DOCUMENTS

Patent Documents

[Patent Document 1] Japanese Patent No. 5441787

DISCLOSURE OF THE INVENTION

Problems to be Solved by the Invention

However, when the solubilization treatment is performed on excess sludge as described in the method for treating organic wastewater of patent document 1, equipment for solubilization is required; which causes increase in cost of equipment and cost of running for equipment maintenance.

Therefore, the objective of the present invention is to provide methods and devices for treating organic wastewater that are possible to reduce the size of a methane fermentation tank, increase the amount of gas generated during a methane fermentation treatment, and minimize costs for both equipment investment and equipment running.

Means to Solve the Problems

To achieve the aforesaid objective, one aspect of the present invention is a method for treating organic wastewater, the method including a raw sludge removal step for removing raw sludge from organic wastewater, a raw sludge concentration step for concentrating the raw sludge removed from the organic wastewater to a prescribed concentration to obtain concentrated raw sludge, a biological treatment step for biologically treating the organic wastewater from which the raw sludge was removed, an excess sludge separation step for separating excess sludge from the biologically treated organic wastewater, an excess sludge concentration step for concentrating the separated excess sludge to a prescribed concentration to obtain concentrated excess sludge, a sludge mixing step for mixing the concentrated raw sludge and the concentrated excess sludge to obtain mixed sludge, and a methane fermentation treatment step for supplying the mixed sludge to a methane fermentation tank and performing a methane fermentation treatment, wherein the method for treating organic wastewater is characterized by further including a sterilization step for heating and sterilizing the concentrated excess sludge incorporated upstream of the sludge mixing step; and a control step for controlling the mixed sludge at a temperature adaptable to methane fermentation by adjusting at least one among (1) the temperature to which the concentrated excess sludge is heated in the sterilization step, (2) the concentration of the concentrated raw sludge in the raw sludge concentration step and/or the concentration of the concentrated excess sludge in the excess sludge concentration step, and (3) the mixture ratio between the concentrated raw sludge and the concentrated excess sludge in the sludge mixing step according to the fluctuations in the amount of raw sludge generated and the amount of the excess sludge generated.

In addition, another aspect of the present invention is a device for treating organic wastewater, the device including raw sludge removal means for removing raw sludge from organic wastewater, raw sludge concentration means for concentrating the raw sludge removed from the organic wastewater to a prescribed concentration to obtain concentrated raw sludge, a biological treatment tank for biologically treating the organic wastewater from which the raw sludge was removed, excess sludge separation means for separating excess sludge from the biologically treated organic wastewater, excess sludge concentration means for concentrating the separated excess sludge to a prescribed concentration to obtain concentrated excess sludge, a sludge mixing tank for mixing the concentrated raw sludge and the concentrated excess sludge to obtain mixed sludge, and a methane fermentation tank for performing a methane fermentation treatment on the mixed sludge, wherein the device for treating organic wastewater is characterized by having: a heating/sterilization device for heating and sterilizing the concentrated excess sludge retrieved from the excess sludge concentration means; and a control device for controlling the mixed sludge at a temperature adaptable to methane fermentation by adjusting at least one among (1) the temperature to which the concentrated excess sludge is heated in a sterilization step achieved by the heating/sterilization device, (2) the concentration of the concentrated raw sludge in a raw sludge concentration step achieved by the raw sludge concentration means and/or the concentration of the concentrated excess sludge in an excess sludge concentration step achieved by the excess sludge concentration means, and (3) the mixture ratio between the concentrated raw sludge and the concentrated excess sludge in a sludge mixing step achieved in the sludge mixing tank according to the fluctuations in the amount of raw sludge generated and the amount of the excess sludge generated.

According to the present invention, as the concentrated excess sludge is heated and sterilized, whereby when the mixed sludge is subjected to methane fermentation, it is possible to facilitate degradation of the concentrated excess sludge by microorganisms, to reduce the time required for methane fermentation and the capacity of the methane fermentation tank, and to increase the efficiency of degrading sludge and the amount of digestion gas generated.

In addition, after being heated and sterilized, the heated concentrated excess sludge is mixed with the concentrated raw sludge, whereby the mixed sludge reaches a temperature adaptable to methane fermentation; viz. the methane fermentation can be promoted by utilizing the thermal energy stored in the heated concentrated excess sludge when the concentrated excess sludge gets heated and sterilized, which makes it possible to reduce or obviate the need for heating in the methane fermentation tank.

Furthermore, even when the amount of raw sludge generated and the amount of excess sludge generated fluctuates, the temperature of the mixed sludge can be maintained at a temperature adaptable to methane fermentation by controlling at least one among (1) the temperature to which the concentrated excess sludge is heated in the sterilization step, (2) the concentration of the concentrated raw sludge in the raw sludge concentration step and/or the concentration of the concentrated excess sludge in the excess sludge concentration step, and (3) the mixture ratio between the concentrated raw sludge and the concentrated excess sludge in the sludge mixing step.

In the method for treating organic wastewater according to the present invention, the control step preferably includes a step S1 setting the temperature to which the concentrated excess sludge is heated in the sterilization step at a temperature within a prescribed range feasible for sterilization, a step S2 setting the mixture ratio between the concentrated raw sludge and the concentrated excess sludge so that the temperature of the mixed sludge reaches a prescribed temperature adaptable to methane fermentation, and a step S3 adjusting the concentration of the concentrated raw sludge concentrated in the raw sludge concentration step and/or the concentration of the concentrated excess sludge concentrated in the excess sludge concentration step within a range(s) according to the fluctuations in the amount of raw sludge generated and the amount of excess sludge generated, so that the mixture ratio between the concentrated raw sludge and the concentrated excess sludge reaches the mixture ratio set in the step S2.

According to this aspect of the present invention, the temperature to which the concentrated excess sludge is heated in the sterilization step is set to a prescribed temperature, while the mixture ratio between the concentrated raw sludge and the concentrated excess sludge is determined so that the temperature of the mixed sludge reaches a prescribed temperature adaptable for methane fermentation, and the concentration of the concentrated raw sludge in the raw sludge concentration step and/or the concentration of the concentrated excess sludge in the excess sludge concentration step are adjusted according to the fluctuations in the amount of raw sludge generated and the amount of excess sludge generated, so that the mixture ration between the concentrated raw sludge and the concentrated excess sludge reaches the said determined one, thereby making it possible to maintain the temperature of the mixed sludge at the prescribed temperature adaptable to methane fermentation even when the amount of raw sludge generated and the amount of excess sludge generated fluctuate.

In the method for treating organic wastewater according to the present invention, when the adjustment of concentration(s) in the step S3 fail(s) to achieve within the range(s) adjustable in accordance with the concentration of the concentrated raw sludge and/or the concentration of the concentrated excess sludge, it is preferable that the adjustment of concentration(s) in the step S3 is/are executed by adjusting concentration(s) approaching a value determined within the range(s) in which adjustments are possible.

According to this aspect of the present invention, even when the amount of raw sludge generated and the amount of excess sludge generated greatly fluctuate, and the adjustment of the concentration of the concentrated raw sludge and/or the concentration of the concentrated excess sludge in the step S3 cannot be achieved within a possible adjusting range, the temperature of the mixed sludge still can be maintained, to the extent possible, at a prescribed temperature adaptable to methane fermentation.

In the method for treating organic wastewater according to the present invention, when the adjustment of concentration(s) in the step S3 fail(s) to achieve within the range(s) adjustable in accordance with the concentration of the concentrated raw sludge and/or the concentration of the concentrated excess sludge, it is preferable that the adjustment of concentration(s) in the step S3 is/are executed by changing the temperature setting in the step S1 to which the concentrated excess sludge is heated within a range feasible for sterilization, and by resetting the mixture ratio between the concentrated raw sludge and the concentrated excess sludge in the step S2 in accompaniment with the change in the heating temperature, thereby making it possible to adjust the concentration(s) in the step S3.

According to this aspect of the present invention, even when the amount of raw sludge generated and the amount of excess sludge generated greatly fluctuate, and the adjustment of the concentration of the concentrated raw sludge and/or the concentration of the concentrated excess sludge in the step S3 cannot be achieved within a possible adjusting range, it is still possible to maintain the mixed sludge at a temperature adaptable to methane fermentation by changing the temperature to which the concentrated excess sludge is heated within a range in which sterilization is possible, in accompaniment with resetting the mixture ratio between the concentrated raw sludge and the concentrated excess sludge in the step S2, thereby making it possible to adjust the concentration(s) in the step S3.

In the method for treating organic wastewater according to the present invention, the control step preferably includes:

a step S21 determining the mixture ratio between the concentrated raw sludge and the concentrated excess sludge on the fluctuations in the amount of raw sludge generated and the amount of the excess sludge generated; and a step S22 adjusting the temperature to which the concentrated excess sludge is heated in accordance with the mixture ratio determined in the step S21 so that the temperature of the mixed sludge reaches a prescribed temperature adaptable to methane fermentation.

According to this aspect of the present invention, the temperature to which the concentrated excess sludge is heated is adjusted, in accordance with the mixture ratio between the concentrated raw sludge and the concentrated excess sludge on the fluctuations in the amount of raw sludge generated and the amount of excess sludge generated, so that the temperature of the mixed sludge reaches a prescribed temperature adaptable to methane fermentation, thereby making it possible to maintain the temperature of the mixed sludge at a prescribed temperature adaptable to methane fermentation even when the amount of raw sludge generated and the amount of excess sludge generated fluctuate.

In the method for treating organic wastewater according to the present invention, when the adjustment of heating temperature in the concentrated excess sludge in the step S22 fails to achieve, it is preferable that the adjustment of heating temperature for the concentrated excess sludge in the step S22 is executed by changing the concentration of the concentrated raw sludge concentrated in the raw sludge concentration step and/or the concentration of the concentrated excess sludge concentrated in the excess sludge concentration step so as to change the mixture ratio determined between the concentrated raw sludge and the concentrated excess sludge in the step S21, thereby making it possible to adjust the temperature to which the concentrated excess sludge is heated.

According to this aspect of the present invention, even when the amount of raw sludge generated and the amount of excess sludge generated greatly fluctuate, the adjustment of the temperature to which the concentrated excess sludge is heated in the step S22 fails to be achieved within the prescribed range feasible for sterilization, it can be achieved by changing the concentration of the concentrated raw sludge and/or the concentration of the concentrated excess sludge so as to modify the mixture ratio between the concentrated raw sludge and the concentrated excess sludge in the step S21, thereby making it possible to adjust the temperature to which the concentrated excess sludge is heated and maintain the temperature of the mixed sludge at a prescribed temperature adaptable to methane fermentation.

In the method for treating organic wastewater according to the present invention, the temperature to which the concentrated excess sludge is heated in the sterilization step is preferably set within a range of 60–160° C.

In the method for treating organic wastewater according to the present invention, the temperature to which the concentrated excess sludge is heated in the sterilization step is preferably set at a temperature of averagely 80° C. or higher while partly within 90-100° C.

In the method for treating organic wastewater according to the present invention, the temperature of the mixed sludge is preferably of 30-40° C., adaptable to mesophilic fermentation.

Advantageous Effects of the Invention

According to the present invention, the concentrated excess sludge is heated and sterilized, whereby when the mixed sludge is subjected to methane fermentation, it is possible to facilitate degradation of the concentrated excess sludge by microorganisms, to reduce the time required for methane fermentation and reduce the capacity of the methane fermentation tank, and to increase the efficiency of degrading sludge and increase the amount of methane gas generated.

In addition, after the concentrated excess sludge is heated and sterilized, the heated concentrated excess sludge is mixed with the concentrated raw sludge, whereby the mixed sludge is brought to a temperature adaptable to methane fermentation; therefore, it is possible to promote methane fermentation by utilizing the thermal energy stored in the heated concentrated excess sludge when the concentrated excess sludge gets heated and sterilized, making it possible to reduce or obviate the need for heating in the methane fermentation tank.

BEST MODE FOR CARRYING OUT THE INVENTION

An embodiment of the present invention is described below with reference to the drawings.

Figure 1:
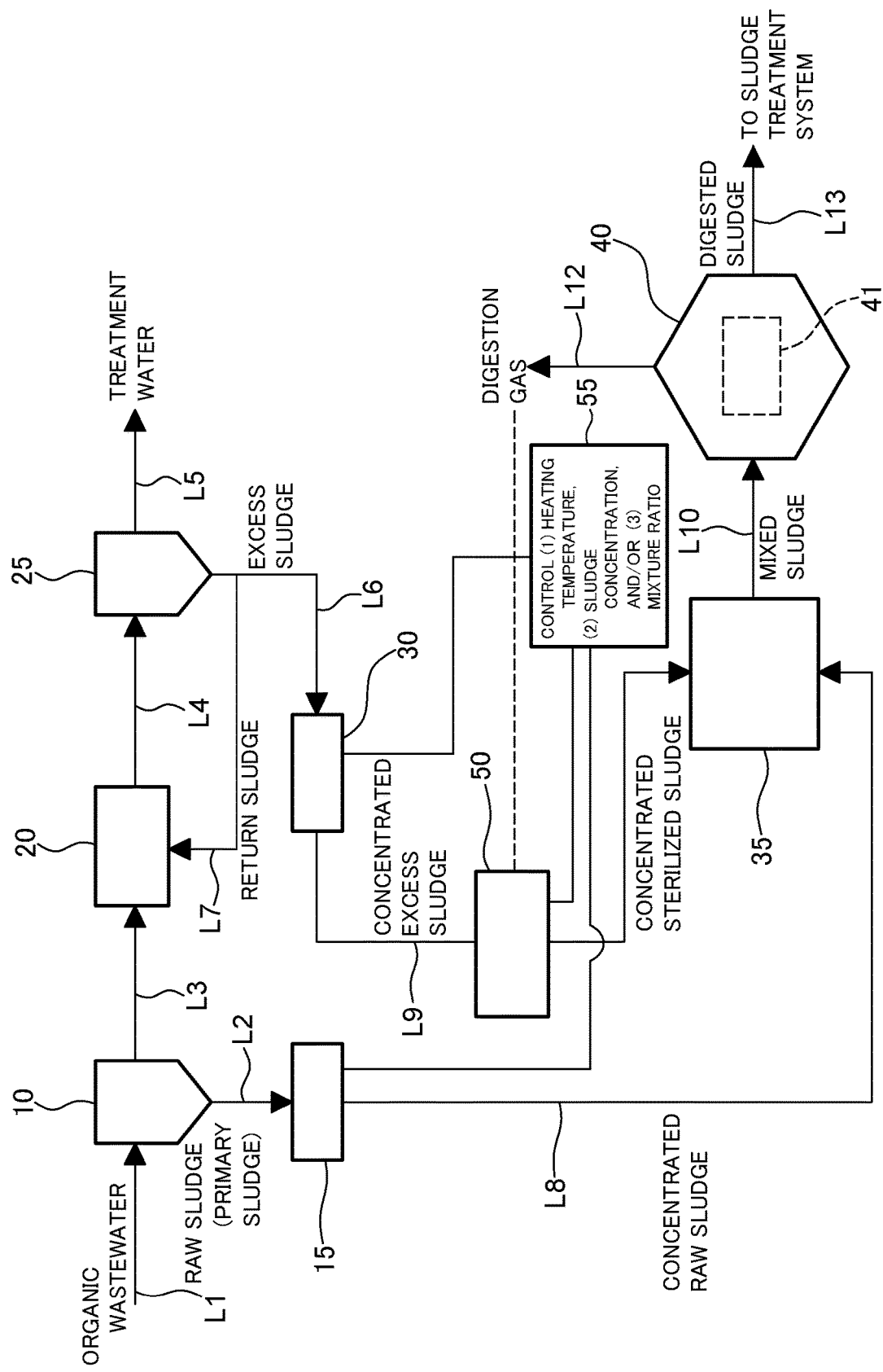
FIG. 1 is a schematic diagram of a device for treating organic wastewater according to the present invention.

As shown in FIG. 1, the device for treating organic wastewater (also referred to simply as "treatment device" hereafter) according to the present embodiment has a raw sludge removal tank 10 for removing raw sludge from organic wastewater. A pipe L1 extending from a supply source of organic wastewater such as sewage is connected to the raw sludge removal tank 10. The raw sludge removal tank 10 performs solid-liquid separation to separate the solid matter such as fibrous components from the organic wastewater supplied from the pipe L1 to obtain raw sludge (primary sludge) and organic wastewater from which the raw sludge was removed. There is no particular limitation as to the raw sludge removal tank, provided that it is possible to perform solid-liquid separation of the organic wastewater; for example, a well-known gravity settling tank, etc., can be utilized, or a high-speed filtration tank, etc., instead may be utilized. The raw sludge removal tank 10 serves as the "raw sludge removal means" in the present invention.

A raw sludge concentrator 15 is connected to the raw sludge removal tank 10 via a pipe L2. The raw sludge concentrator 15 concentrates the raw sludge that was removed from the organic wastewater, supplied from the raw sludge removal tank 10 through the pipe L2, to a prescribed concentration to obtain concentrated raw sludge. The raw sludge concentrator 15 serves as the "raw sludge concentration means" in the present invention.

A gravity concentration tank, for example, in which gravity is utilized to settle and thicken the raw sludge can be used as the raw sludge concentrator 15. In the case of the gravity concentration tank, the volume (V(x')) of concentrated raw sludge obtained per unit time can be adjusted by controlling the sludge introduction load, the chemical feeding rate (meaning the proportion of the injection amount of a chemical such as a polymer aggregating agent; the same is applied below), etc. Aside from the above gravity concentration in which gravity is utilized, mechanical concentration, such as centrifugal concentration, belt filtration concentration, and atmospheric flotation concentration, can also be employed as the method for concentrating the raw sludge. The volume (V(x')) of the concentrated raw sludge can be adjusted by: controlling the centrifugal force, chemical feeding rate, etc., in the case of centrifugal concentration; controlling the belt rotation speed, etc., in the case of belt filtration concentration; and controlling the amount of bubble auxiliary agent added, etc., in the case of atmospheric flotation concentration.

Furthermore, a biological treatment tank 20 is connected to the raw sludge removal tank 10 via a pipe L3. The biological treatment tank 20 performs a biological treatment on the organic wastewater from which the raw sludge was removed, the organic wastewater being supplied from the raw sludge removal tank 10 through the pipe L3. An aeration tank, etc., in which air is blown in and organic matter is degraded by aerobic microorganisms, for example, is used as the biological treatment tank 20, but there is no particular limitation as to the biological treatment tank, provided that there is a method by which the organic matter can be degraded.

A sludge separation tank 25 is connected to the biological treatment tank 20 via the pipe L4. The sludge separation tank 25 performs solid-liquid separation to separate the treated organic wastewater into sludge and treatment water, the biologically treated organic wastewater being supplied from the biological treatment tank 20 through the pipe L4. A gravity settling tank, a membrane separation device, etc., can be utilized as the sludge separation tank; there is no particular limitation as to the sludge separation tank, provided that the biologically treated organic wastewater can be subjected to solid-liquid separation into the sludge and the treatment water.

The treatment water from which the sludge was removed in the sludge separation tank 25 is discharged from the system via a pipe L5. The sludge separation tank 25 is connected to the biological treatment tank 20 via a pipe L7, and is connected to an excess sludge concentrator 30 via a pipe L6. The majority of the sludge separated in the sludge separation tank 25 is returned to the biological treatment tank 20 as return sludge via the pipe L7, while a portion of the sludge is sent to the excess sludge concentrator 30 via the pipe L6 as excess sludge. The sludge separation tank 25 and the pipe L6 serve as the "excess sludge separation means" in the present invention.

The excess sludge concentrator 30 concentrates the excess sludge supplied from the sludge separation tank 25 through the pipe L6 to a prescribed concentration to obtain concentrated excess sludge. The excess sludge concentrator 30 serves as the "excess sludge concentration means" in the present invention.

A belt concentrator, etc., in which sludge is filtered and thickened on a mesh-form belt, for example, can be utilized as the excess sludge concentrator 30. In this belt concentrator, the volume (V(y')) of the concentrated excess sludge obtained per unit time can be adjusted by adjusting the concentration of excess sludge through the rotation speed (movement speed) of the belt (belt filtration compression). Aside from belt filtration concentration as described above, mechanical concentration such as centrifugal concentration and atmospheric flotation concentration may be used as the method for concentrating the excess sludge, and furthermore, gravity concentration in which gravity is utilized to settle and thicken the excess sludge may be used. The volume (V(y')) can be adjusted by: controlling the centrifugal force, chemical feeding rate, etc., in the case of centrifugal concentration; controlling the amount of bubble auxiliary agent added, etc., in the case of atmospheric flotation concentration; and controlling the sludge introduction load, the chemical feeding rate, etc., in the case of gravity concentration.

The raw sludge concentrator 15 is connected to a sludge mixing tank 35 via a pipe L8, and the excess sludge concentrator 30 is connected to the sludge mixing tank 35 via a pipe L9. The sludge mixing tank 35 mixes the concentrated raw sludge supplied from the raw sludge concentrator 15 via the pipe L8 and the concentrated excess sludge supplied from the excess sludge concentrator 30 via the pipe L9 to obtain mixed sludge.

The sludge mixing tank 35 is connected to a methane fermentation tank 40 via a pipe L10. The methane fermentation tank 40 performs a methane fermentation treatment (anaerobic treatment), through the action of anaerobic microorganisms such as methanogens, on the mixed sludge supplied from the sludge mixing tank 35 through the pipe L10, and degrades the mixed sludge to digestion gas such as methane gas. A stirring apparatus (not shown) is disposed in the methane fermentation tank 40, the stirring apparatus stirring the fermentation slurry in the tank.

In the present embodiment, a carrier 41 for supporting anaerobic digesting bacteria is disposed within the methane fermentation tank 40. This makes it possible to shorten the hydraulic retention time (HRT) of the mixed sludge within the methane fermentation tank; therefore, it is possible to reduce the size of the methane fermentation tank 40 and reduce the cost for constructing the same, to increase the efficiency of digesting the mixed sludge, and to increase the amount of digestion gas generated. The carrier 41 is preferably buoyant so as not to hinder the stirring of the mixed sludge within the methane fermentation tank 40.

A pipe L12 for drawing out the digestion gas such as methane gas is connected to the methane fermentation tank 40. Some of the digestion gas can be utilized as fuel in a heating/sterilization device 50 (described later). Furthermore, a pipe L13 for drawing out the methane fermentation slurry is connected to the methane fermentation tank 40. The methane fermentation slurry drawn out from the methane fermentation tank 40 is transferred to a sludge treatment system (not shown) and treated.

The treatment device has: a heating/sterilization device 50 for heating and sterilizing the concentrated excess sludge retrieved from the excess sludge concentration means; and a control device 55 for controlling the mixed sludge at a temperature adaptable to methane fermentation by adjusting at least one among (1) the temperature to which the concentrated excess sludge is heated in a sterilization step achieved by the heating/sterilization device 50, (2) the concentration of the concentrated raw sludge in a raw sludge concentration step achieved by the raw sludge concentration means (raw sludge concentrator 15) and/or the concentration of the concentrated excess sludge in an excess sludge concentration step achieved by the excess sludge concentration means (excess sludge concentrator 30), and (3) the mixture ratio between the concentrated raw sludge and the concentrated excess sludge in a sludge mixing step achieved in the sludge mixing tank 35 according to the fluctuations in the amount of raw sludge generated and the amount of the excess sludge generated.

As the heating/sterilization device 50, a device having a structure in which steam is blown into the pipe L9 or in which hot water is drained, or a heat exchanger having a tube-type, plate-type, or spiral-type configuration that can be disposed within the pipe or on the outer periphery of the pipe, for example, may be used, provided that the concentrated excess sludge flowing through the pipe L9 can be heated and sterilized. Digestion gas drawn out from the methane fermentation tank 40 may be utilized as a fuel source for a heat exchanger, or steam or hot water in the heating/sterilization device 50.

In the present embodiment, as shown in FIG. 1, the heating/sterilization device 50 is disposed partway along the pipe L9 that connects the excess sludge concentrator 30 and the sludge mixing tank 35 to each other, and the control device 55 is connected to the heating/sterilization device 50.

In addition, measuring instrumentation (not shown) for measuring the flow rate per unit time and the temperature of the concentrated raw sludge is provided to the pipe L8, and measuring instrumentation (not shown) for measuring the flow rate per unit time and the temperature of the concentrated excess sludge after being heated and sterilized is provided to the pipe L9. The flow rates and temperatures measured by the measuring instrumentation are transmitted to the control device 55, the control device 55 being capable of executing the controls (1) through (3) described above by utilizing these measurement values and preset values.

The method for treating organic wastewater according to the present invention described next through an example of a case in which a device for treating organic wastewater having the above structure is utilized.

Organic wastewater is supplied through the pipe L1 to the raw sludge removal tank 10, where solid matter such as fibrous components in the organic wastewater sets, and is separated as raw sludge (primary sludge) (raw sludge removal step).

The raw sludge is sent to the raw sludge concentrator 15 through the pipe L2, concentrated, and formed into concentrated raw sludge (raw sludge concentration step). In the case where gravity concentration is applied in the raw sludge concentrator, for example, the concentration of the concentrated raw sludge can be adjusted by controlling the sludge introduction amount, the chemical feeding rate, etc. While in the case where mechanical concentration is applied in the raw sludge concentrator, the concentration can be adjusted by: controlling the centrifugal force, chemical feeding rate, etc., when centrifugal concentration is applied; or controlling the belt rotation speed, etc., when belt filtration compression is applied; or controlling the amount of bubble auxiliary agent added, etc., when atmospheric flotation concentration is applied. It is thereby possible to adjust the volume (V(x')) of the concentrated raw sludge obtained per unit time. The concentrated raw sludge obtained in this manner is sent to the sludge mixing tank 35 through the pipe L8.

The organic wastewater from which the raw sludge was removed in the raw sludge removal tank 10 is sent to the biological treatment tank 20 through the pipe L3, and a biological treatment such as an aeration treatment is carried out in the biological treatment tank 20. Due to this biological treatment, organic matter in the organic wastewater is degraded by aerobic microorganisms, etc., and activated sludge having the cell bodies of the microorganisms as its main component is formed.

The biologically treated organic wastewater in the biological treatment tank 20, is sent to the sludge separation tank 25 through the pipe L4, where the sludge is separated, the treatment water from which the sludge was removed is discharged from the system through the pipe L5.

The majority of the sludge separated in the sludge separation tank 25 is returned to the biological treatment tank 20 as return sludge via the pipe L7, while a portion of the sludge separated in the sludge separation tank 25 is sent to the excess sludge concentrator 30 through the pipe L6 as excess sludge (excess sludge separation step).

The excess sludge sent to the excess sludge concentrator 30 is then concentrated and formed into concentrated excess sludge (excess sludge concentration step). As pertains to the concentration of the concentrated excess sludge in the case of belt filtration compression, for example, the volume (V(y')) of concentrated excess sludge obtained per unit time can be adjusted by adjusting the concentration of excess sludge according to the rotation speed (movement speed) of the belt. Aside from belt filtration concentration as described above, mechanical concentration such as centrifugal concentration and atmospheric flotation concentration may be used, and furthermore, gravity concentration in which gravity is utilized to settle and thicken the excess sludge may also be used. The volume (V(y')) can be adjusted by: controlling the centrifugal force, chemical feeding rate, etc., in the case of centrifugal concentration; controlling the amount of bubble auxiliary agent added, etc., in the case of atmospheric flotation concentration; and controlling the sludge introduction load, the chemical feeding rate, etc., in the case of gravity concentration.

The concentrated excess sludge concentrated in the excess sludge concentrator 30 is sent to the heating/sterilization device 50 through the pipe L9 and is heated and sterilized (sterilization step).

The temperature to which the concentrated excess sludge is heated in the sterilization step is preferably set within a range of 60-160° C., and more preferably set within the range of 60-100° C. When the temperature to which the concentrated excess sludge is heated is less than 60° C., the sterilization of the concentrated excess sludge will be insufficient; conversely, when the temperature to which the concentrated excess sludge is heated exceeds 160° C., the energy in the sterilization step will be excessive.

In addition, the temperature to which the concentrated excess sludge is heated in the sterilization step is preferably set at a temperature of averagely 80° C. or higher while partly within 90-100° C.

Furthermore, the temperature to which the concentrated excess sludge is heated and the time for which the concentrated excess sludge is heated in the sterilization step are preferably selected from among (a) 120-160° C. for 1-5 seconds, (b) 75-85° C. for 15-20 minutes, and (c) 63-65° C. for 30 minutes.

In addition, the concentrated excess sludge can be heated and sterilized by using digestion gas generated by methane fermentation as a fuel source for the heating and sterilization, whereby an effect is obtained in which the need for additional introduction of energy is obviated.

The sterilized concentrated excess sludge is sent to the sludge mixing tank 35 through the pipe L9 and mixed together with the concentrated raw sludge that was sent through the pipe L8, and mixed sludge is formed (sludge mixing step). The temperature of the mixed sludge can be adjusted through the mixture ratio between the concentrated raw sludge and the concentrated excess sludge or the heating/sterilization temperature of the concentrated excess sludge.

The mixture ratio between the concentrated raw sludge and the concentrated excess sludge in the sludge mixing step is, e.g., preferably such that concentrated raw sludge:concentrated excess sludge=1:1 to 3:1 when the temperature to which the concentrated excess sludge is heated in the sterilization step is 60° C., preferably such that concentrated raw sludge:concentrated excess sludge=2:1 to 5:1 when the same heating temperature is 80° C., and preferably such that concentrated raw sludge:concentrated excess sludge=4:1 to 9:1 when the same heating temperature is 120° C.

The control device 55 performs control by controlling at least one among (1) the temperature to which the concentrated excess sludge is heated in the sterilization step, (2) the concentration of the concentrated raw sludge in the raw sludge concentration step and/or the concentration of the concentrated excess sludge in the excess sludge concentration step, and (3) the mixture ratio between the concentrated raw sludge and the concentrated excess sludge in the sludge mixing step is adjusted according to the fluctuations in the amount of raw sludge generated and the amount of the excess sludge generated, and so that the temperature of the mixed sludge reaches a temperature adaptable to methane fermentation.

It is preferable that the mixed sludge that was mixed can be adapted, through the temperature to which the concentrated excess sludge is heated in the sterilization step described above or the mixture ratio between the concentrated raw sludge and the concentrated excess sludge in the sludge mixing step, to mesophilic fermentation in which the fermentation temperature is of 30-40° C., in particular.

According to the treatment method described above, the concentrated excess sludge is heated and sterilized, whereby when the mixed sludge is subjected to methane fermentation, it is possible to facilitate degradation of the concentrated excess sludge by microorganisms, to reduce the time (hydraulic retention time: HRT) required for methane fermentation and the capacity of the methane fermentation tank, and to increase the efficiency of degrading sludge and the amount of digestion gas generated.

Because it is possible to reduce the size of the methane fermentation tank, equipment costs can be reduced. Though equipment of the heating/sterilization device for heating and sterilizing the concentrated excess sludge is required, it is possible to make such equipment more compact than that conventionally required for solubilizing excess sludge; furthermore, the heating can be fulfilled within several seconds when the heating temperature is high like 100-160° C.; (described later), and therefore the heating step can be implemented within a pipe, and reducing the equipment costs is achievable.

In addition, after the concentrated excess sludge is heated and sterilized, the heated concentrated excess sludge is mixed with the concentrated raw sludge, whereby the mixed sludge is brought to a temperature adaptable to methane fermentation; therefore, it is possible to promote methane fermentation by utilizing the thermal energy stored in the heated concentrated excess sludge when the concentrated excess sludge gets heated and sterilized, to reduce or obviate the need for heating in the methane fermentation tank, and to reduce the running costs.

In a preferred aspect of the present invention, no heating of the methane fermentation tank 40 is performed in the methane fermentation treatment step. According to this aspect, methane fermentation is promoted by utilizing the thermal energy stored in the heated concentrated excess sludge when the concentrated excess sludge gets heated and sterilized, so that no heating of the methane fermentation tank is necessarily performed, thereby suppressing consumption of the energy obtained through methane fermentation makes it possible to increase the amount of energy to be utilized in other applications.

In addition, even when the amount of raw sludge generated and the amount of excess sludge generated fluctuate, the temperature of the mixed sludge can be maintained at a temperature adaptable to methane fermentation by controlling at least one among (1) the temperature to which the concentrated excess sludge is heated in the sterilization step, (2) the concentration of the concentrated raw sludge in the raw sludge concentration step and/or the concentration of the concentrated excess sludge in the excess sludge concentration step, and (3) the mixture ratio between the concentrated raw sludge and the concentrated excess sludge in the sludge mixing step.

Figure 2:
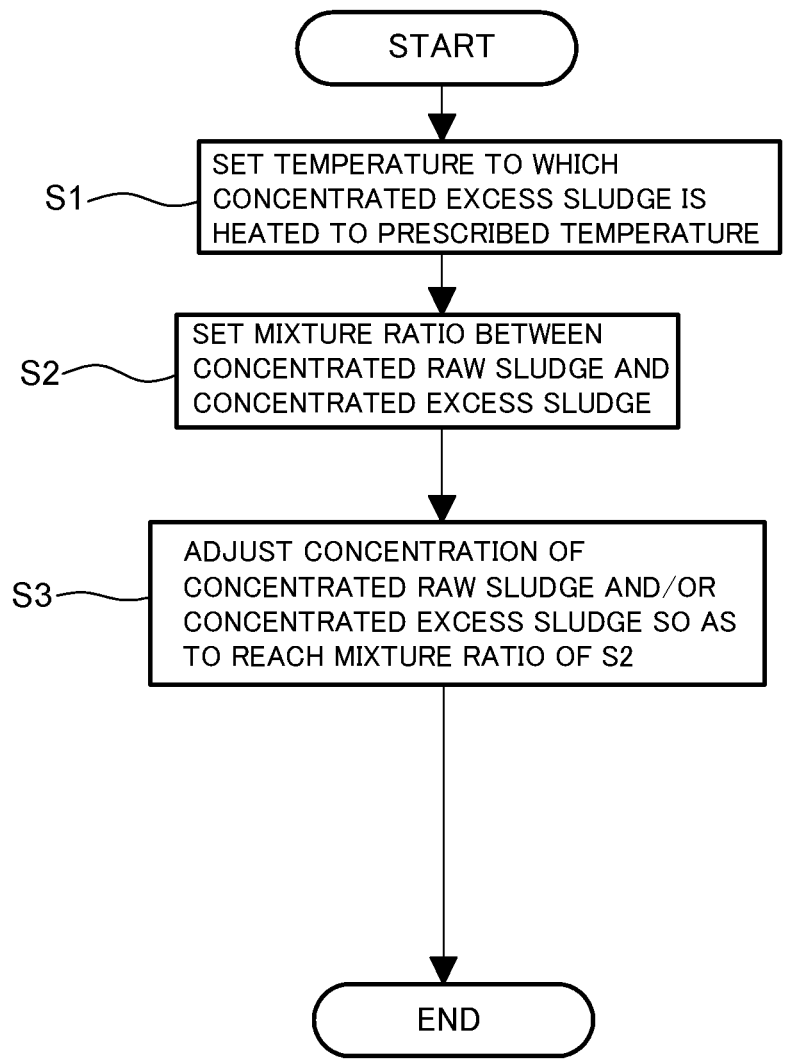
FIG. 2 is a flow chart showing an example of a control method in a method for treating organic wastewater according to the present invention.

Next, One example of the method for control by the control device 55 is described with reference to FIG. 2 and FIG. 3. As shown in FIG. 2, this method includes a step S1 setting the temperature to which the concentrated excess sludge is heated in the sterilization step at a temperature within a prescribed range feasible for sterilization, a step S2 setting the mixture ratio between the concentrated raw sludge and the concentrated excess sludge such that the temperature of the mixed sludge reaches a prescribed temperature adaptable to methane fermentation, and a step S3 adjusting the concentration of the concentrated raw sludge in the raw sludge concentration step and/or the concentration of the concentrated excess sludge in the excess sludge concentration step according to the fluctuations in the amount of raw sludge generated and the amount of excess sludge generated, so that the mixture ratio between the concentrated raw sludge and the concentrated excess sludge reaches the mixture ratio set in the step S2.

Figure 3A:
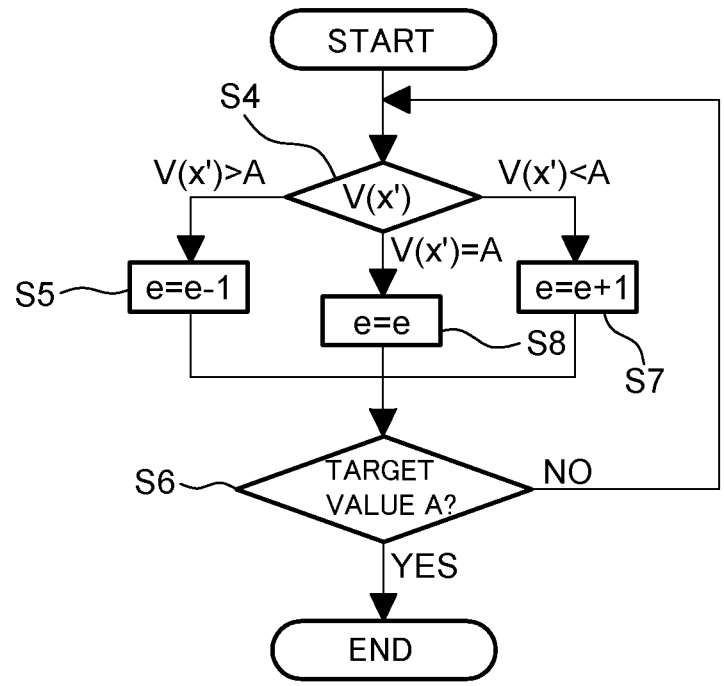
FIGS. 3A and 3B are flow charts showing an example of a method for adjusting the concentration of the raw sludge or the concentrated excess sludge in the control method shown in FIG. 2.

The method used in the step S3 to adjust the concentration of the concentrated raw sludge in the raw sludge concentration step is described through one example of a case in which a belt concentrator is used as the raw sludge concentrator 15. As shown in FIG. 3A, in a step S4, the obtainable volume of per unit time V(x') of the concentrated raw sludge (i.e., the flow rate per unit time of the concentrated raw sludge flowing through the pipe L8) and a target value A are compared. If V(x')>target value A, then in a step S5, the rotation speed e of a belt concentrator (not shown) of the raw sludge concentrator 15 is set to e−1. Then, in a step S6, the comparison with the target value A is made again; if the target value A has been reached, the operation ends, but if the target value A has not been reached, the operation returns to the step S4, the rotation speed is further reduced through the step S5, and in the step S6 comparison to determine whether the target value A has been reached is made again. This operation is repeated until the V(x') reaches the value A.

And in the step S4, if V(x')<target value A, then in a step S7, the rotation speed e of the belt concentrator (not shown) of the raw sludge concentrator 15 is set to e+1. Then, in the step S6, the comparison with the target value A is made again; if the target value A has been reached, the operation ends. If the target value A has not been reached, the operation returns to the step S4, the rotation speed is further increased through the step S7, and in the step S6 a comparison to determine whether the target value A has been reached is further made. This operation is repeated until V(x') reaches the value A.

In the step S4, if V(x')=target value A, then it is confirmed through a step S8 and the step S6 that the target value A has been reached, and the operation ends.

Figure 3B:
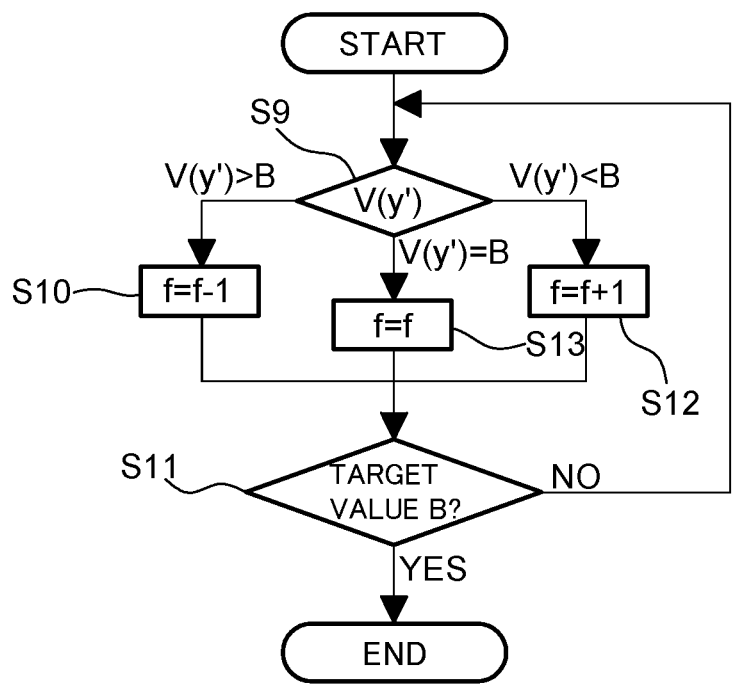

Next, a method used in the step S3 to adjust the concentration of the concentrated excess sludge in the excess sludge concentration step is described through one example of a case in which a belt concentrator is used as the excess sludge concentrator 30. As shown in FIG. 3B, in a step S9, the obtainable volume of per unit time V(y') of the concentrated excess sludge (i.e., the flow rate per unit time of the concentrated excess sludge flowing through the pipe L9) and a target value B are compared. If V(y')>target value B, then in a step S10, the rotation speed f of a belt concentrator (not shown) of the excess sludge concentrator 30 is set to f−1. Then, in a step S11 the comparison with the target value B is made again; if the target value B has been reached, the operation ends. If the target value B has not been reached, the operation returns to the step S9, and the rotation speed is further reduced through the step S10, and in the step S11 a comparison to determine whether the target value B has been reached is further made. This operation is repeated until V(y') reaches the value B.

In the step S9, if V(y')<target value B, then in a step S12, the rotation speed f of the belt concentrator (not shown) of the excess sludge concentrator 30 is set to f+1. Then, in the step S11, the comparison with the target value B is made again; if the target value B has been reached, the operation ends. If the target value B has not been reached, the operation returns to the step S9, the rotation speed is further increased through the step S12, and in the step S11 a comparison to determine whether the target value B has been reached is further made. This operation is repeated until V(y') reaches the value B.

In the step S9, if V(y')=target value B, then it is confirmed through a step S13 and the step S11 that the target value B has been reached, and the operation ends.

According to this aspect, the temperature to which the concentrated excess sludge is heated in the sterilization step is set, and the mixture ratio between the concentrated raw sludge and the concentrated excess sludge is determined so that the temperature of the mixed sludge reaches a prescribed temperature adaptable to methane fermentation; the concentration of the concentrated raw sludge in the raw sludge concentration step and/or the concentration of the concentrated excess sludge in the excess sludge concentration step is adjusted according to the fluctuations in the amount of raw sludge generated and the amount of excess sludge generated, so that the mixture ratio between the concentrated raw sludge and the concentrated excess sludge reaches the aforementioned mixture ratio. All this thereby makes it possible to maintain the temperature of the mixed sludge at a prescribed temperature adaptable to methane fermentation even when the amount of raw sludge generated and the amount of excess sludge generated fluctuate.

Aside from the method for raising and lowering the rotation speed of the belt concentrator used as the raw sludge concentrator 15 and/or the excess sludge concentrator 30 as described above, the proportion (chemical feeding rate) of the injection amount of a chemical such as a polymer aggregating agent may be raised and lowered as the means for adjusting the concentrated raw sludge and the concentrated excess sludge to the target values A and B described using FIGS. 3A and 3B respectively.

Figure 4:
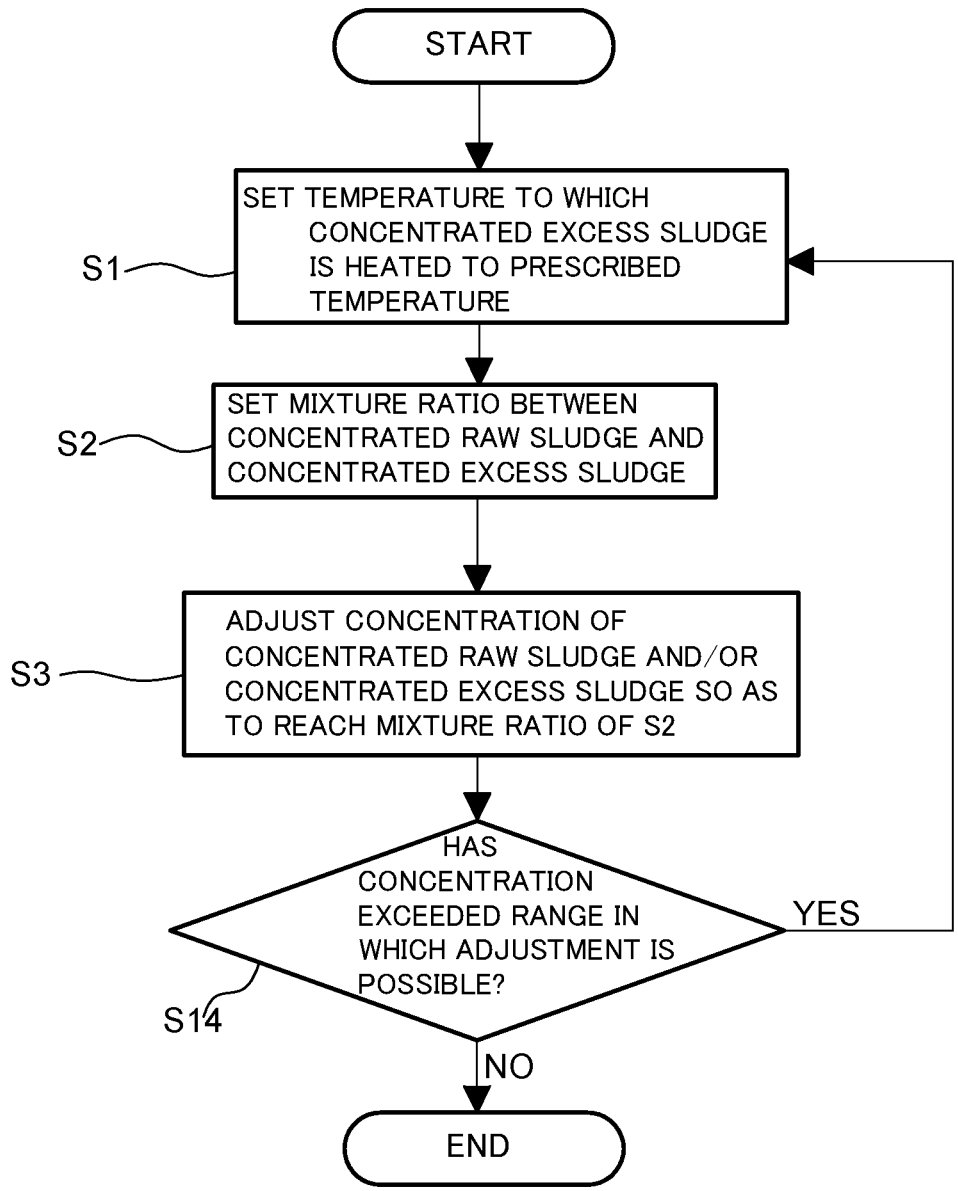
FIG. 4 is a flow chart showing another example of a control method for treating organic wastewater according to the present invention.

FIG. 4 shows a further enhanced example of the above control method. In this method, it is determined in a step S14 whether or not the concentration(s) of the concentrated raw sludge and/or the concentrated excess sludge determined in the step S3 is/are within a range(s) in which concentration adjustments are possible. If the concentration(s) of the concentrated raw sludge and/or the concentrated excess sludge determined in the step S3 exceed(s) the range(s) in which concentration adjustments are possible, the operation returns to the step S1 and the temperature at which the concentrated excess sludge is sterilized is changed and reset. On the basis of the reset temperature, the mixture ratio between the concentrated raw sludge and the concentrated excess sludge is determined in the step S2, and the concentrations of the concentrated raw sludge and/or the concentrated excess sludge is/are adjusted so that the mixture ratio between the concentrated raw sludge and the concentrated excess sludge reaches the aforementioned one determined in the step S3. Then, it is again determined in the step S14 whether or not the concentration(s) exceed(s) the range(s) in which concentration adjustment are possible. If the concentration(s) still exceed(s) the range(s) in which adjustments are possible, the operation returns to the step S1 and the temperature at which the concentrated excess sludge is sterilized is further changed and reset, and the following steps are repeated. This operation is repeated until when it is confirmed in the step S14 that the concentration(s) of the concentrated raw sludge and/or the concentrated excess sludge is/are within the range(s) in which adjustments are possible, then the operation ends.

According to this aspect, even when the concentration(s) of the concentrated raw sludge and/or the concentrated excess sludge exceed(s) the range(s) in which adjustments are possible, the temperature at which the concentrated excess sludge is sterilized is changed and reset, thereby making it possible to adjust the concentration(s) of the concentrated raw sludge and/or the concentrated excess sludge to the range(s) in which adjustments are possible, and to maintain the temperature of the mixed sludge at a temperature adaptable to methane fermentation even when the amount of raw sludge generated and the amount of excess sludge generated greatly fluctuate.

In the above aspect, when it is determined in the step S14 that the concentration(s) of the concentrated raw sludge and/or the concentrated excess sludge exceed(s) the range(s) in which adjustments are possible, the operation can also be ended by adjusting the concentration so as to approach, to the extent possible, a value determined within the range in which adjustments are possible.

Figure 5:
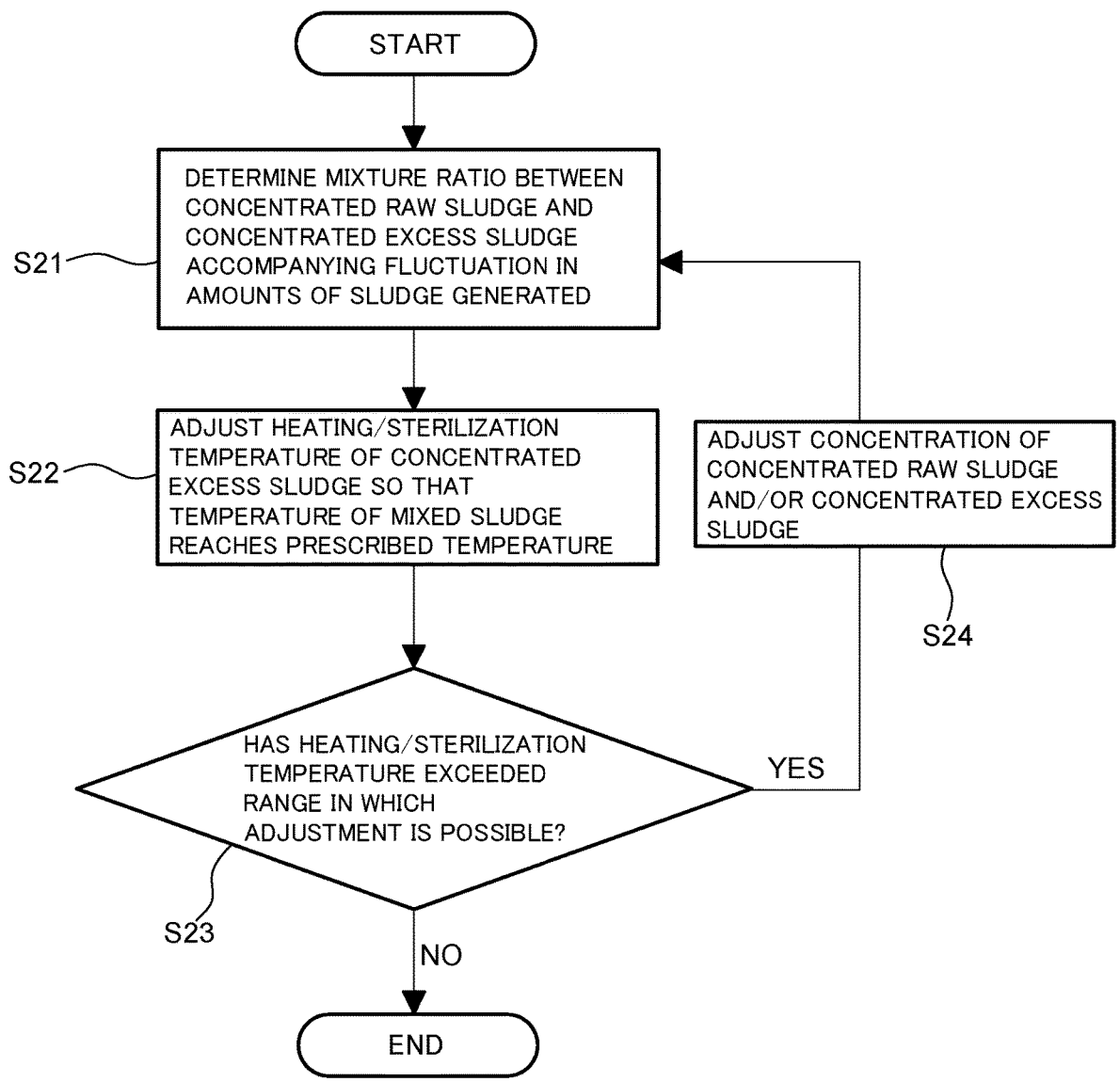
FIG. 5 is a flow chart showing a further example of a control method for treating organic wastewater according to the present invention.

FIG. 5 shows a further different example of a method for control by the control device 55. In this method, the mixture ratio between the concentrated raw sludge and the concentrated excess sludge on the fluctuations in the amount of raw sludge generated and/or the amount of the excess sludge generated is determined in the step S21. Specifically, when the amount of raw sludge generated and/or the amount of excess sludge generated fluctuates, the volume per unit time of the concentrated raw sludge obtained in the raw sludge concentrator 15 and/or the volume per unit time of the concentrated excess sludge obtained in the excess sludge concentrator 30 fluctuates as well, and the mixture ratio between the concentrated raw sludge and the concentrated excess sludge changes; therefore, this mixture ratio is determined.

In the step S22, in conformity with the changed mixture ratio, the heating/sterilization temperature of the concentrated excess sludge is set so that the temperature of the mixed sludge reaches a temperature adaptable to methane fermentation.

The control may be ended in this state, but in the present example, it is furthermore determined in a step S23 whether or not the above heating/sterilization temperature has exceeded a range in which adjustment is possible. When the heating/sterilization temperature exceeds the range in which adjustment is possible, the concentrations of the concentrated raw sludge and/or the concentrated excess sludge is/are adjusted in a step S24, and the operation returns to the step S21, the mixture ratio between the concentrated raw sludge and the concentrated excess sludge is determined again, the heating/sterilization temperature is reset in the step S22, and it is determined in the step S23 whether or not the above heating/sterilization temperature has exceeded the range in which adjustment is possible. Repeating this operation makes it possible to set the heating/sterilization temperature to a one within the range in which adjustment is possible.

The embodiment described above is not given by way of any limitation of the present invention; various modified embodiments are possible within the scope of the present invention, and such embodiments are also encompassed by the present invention.

EXAMPLES

The effect of the present invention was confirmed below through simulations. The software "GPS-X 6.4" produced by Hydromantis Environmental Software Solutions, Inc. was used as the simulation software.

<Conditions of Sludge Behavior>

The conditions shown in table 1 below were used to represent the raw sludge and the excess sludge.

TABLE 1

|  | Behavior of sludge before concentration | Behavior of sludge after concentration (comparative example) | Behavior of sludge after concentration (examples 1 and 2) |
| --- | --- | --- | --- |
| Raw sludge (primary sludge) | 10000 (gSS/m³) (concentration 1.0%) 11481 (gVSS/m³) 1070 (m³/d) | 31000 (gSS/m³) (concentration 3.1%) 27000 (gVSS/m³) 345 (m³/d) | 31000 (gSS/m³) (concentration 3.1%) 27000 (gVSS/m³) 345 (m³/d) |
| Excess sludge | 6000 (gSS/m³) (concentration 0.6%) 4500 (gVSS/m³) 1380 (m³/d) | 36000 (gSS/m³) (concentration 3.6%) 27000 (gVSS/m³) 230 (m³/d) | 72000 (gSS/m³) (concentration 7.2%) 27000 (gVSS/m³) 115 (m³/d) |
| Heating treatment of excess sludge |  | No | Yes (80° C.) |

In table 1, the "SS" in (gSS/m³) refers to suspended solids, i.e., suspended insoluble solids. "(gSS/m³)" means the mass (g) of suspended solids per cubic meter of sludge. Furthermore, the "VSS" in (gVSS/m³) refers to the ignition loss of the SS, i.e., substances (primarily organic matter) that volatilize when the SS is heated. "(gVSS/m³)" means the mass (g) of organic matter per cubic meter of sludge.

Example 1

In the device for treating organic wastewater shown in FIG. 1, the treatment was performed using a tank having no carrier 41 for microorganisms as the methane fermentation tank 40. The behavior of the raw sludge separated from the raw sludge removal tank 10, the concentrated raw sludge concentrated in the raw sludge concentrator 15, the excess sludge separated from the sludge separation tank 25, and the concentrated excess sludge concentrated in the excess sludge concentrator 30 were as shown in table 1.

The concentrated excess sludge was heated and sterilized at 80° C. by the heating/sterilization device 50, the concentrated raw sludge and the concentrated excess sludge were introduced into the sludge mixing tank 35 so as to reach a volume ratio of 3:1 and were mixed, and the temperature of the mixed sludge was set to 35° C. The mixed sludge was introduced into the methane fermentation tank 40, which had a capacity of 9000 m³, and methane fermentation was performed for 20 days. The amount of digestion gas generated in this case, the methane concentration, and the digestive efficiency were simulated by the simulation software, and the results shown in table 2 below were obtained.

When the temperature of the concentrated raw sludge was 20° C. and the target temperature of the mixed sludge was 35° C., the relationship between the heating/sterilization temperature of the concentrated excess sludge, the volume per day of the concentrated raw sludge, and the volume per day of the concentrated excess sludge were determined according to the formula below, where these variables are designated by T (° C.), V(x'), and V(y'), respectively. The value "15" in the formula below was a coefficient determined by subtracting the temperature (20° C.) of the concentrated raw sludge from the target temperature (35° C.) of the mixed sludge.

$$T = 15\frac{V(x')}{V(y')} + 35 \qquad \text{[Formula 1]}$$

In the case of example 1, V(x') was 345 m³/d and V(y') was 115 m³/d; therefore, the heating/sterilization temperature of the concentrated excess sludge was T=15×(345/115)+35=80° C.

Example 2

In the device for treating organic wastewater shown in FIG. 1, the treatment was performed using a tank having a carrier 41 for microorganisms as the methane fermentation tank 40. All other conditions were the same as in example 1. The amount of digestion gas generated in this case, the methane concentration, and the digestive efficiency were simulated by the simulation software, and the results shown in table 2 below were obtained.

Comparative Example

In the device for treating organic wastewater shown in FIG. 1, the treatment was performed using a conventional treatment device of a type in which the methane fermentation tank 40 was heated, and without the use of the heating/sterilization device 50. The behavior of the raw sludge separated from the raw sludge removal tank 10, the concentrated raw sludge concentrated in the raw sludge concentrator 15, the excess sludge separated from the sludge separation tank 25, and the concentrated excess sludge concentrated in the excess sludge concentrator 30 were as shown in table 1.

Without heating and sterilization of the concentrated excess sludge, the concentrated raw sludge and the concentrated excess sludge were introduced into the sludge mixing tank 35 so as to achieve a volume ratio of 3:2 and were mixed. The mixed sludge was introduced into the methane fermentation tank 40, which had a capacity of 14000 m³, the temperature of the mixed sludge in the methane fermentation tank 40 was raised to 35° C., and methane fermentation was performed for 25 days. The amount of digestion gas generated in this case, the methane concentration, and the digestive efficiency were simulated by the simulation software, and the results shown in table 2 below were obtained.

TABLE 2

|  | Comparative example | Example 1 | Example 2 |
|---|---|---|---|
| Methane fermentation tank (digestion tank) | 14000 m³ | 9000 m³ | 9000 m³ |
| Methane fermentation temperature (digestion temperature) | 35° C. | 35° C. | 35° C. |
| Hydraulic retention time (HRT: raw water reference) | 25 days | 20 days | 20 days |
| Amount of digestion gas | 8088 m³/day | 10100 m³/day | 10410 m³/day |
| Methane concentration | 61% | 62% | 61% |
| Digestive efficiency | 43% | 51% | 56% |
| Notes | — | *25% increase in amount of gas generated, 36% decrease in tank capacity | *29% increase in amount of gas generated, 36% decrease in tank capacity |

As shown in table 2, in example 1, it was apparent that the amount of gas generated was 25% higher and the tank capacity of the methane fermentation tank was 36% lower than those in the comparative example. Also, in example 2, in which a carrier was disposed in the methane fermentation tank, it was apparent that the amount of gas generated was 29% higher and the tank capacity of the methane fermentation tank was 36% lower than those in the comparative example.

<Mixture Ratio Between Concentrated Raw Sludge and Concentrated Excess Sludge>

The mixture ratio (volume ratio) between the concentrated raw sludge and the concentrated excess sludge for setting the temperature of the mixed sludge to 35±5° C., which is adaptable to methane fermentation, was determined for a case where the temperature to which the concentrated excess sludge is heated was set to 120° C., 80° C., and 60° C. respectively. The results were shown in table 3 below.

TABLE 3

| Temperature to which excess sludge was heated | Mixture ratio between concentrated raw sludge and concentrated excess sludge (volume ratio) |
|---|---|
| 120 (° C.) | Concentrated raw sludge:concentrated excess sludge = 17:3 |
| 80 (° C.) | Concentrated raw sludge:concentrated excess sludge = 9:3 |
| 60 (° C.) | Concentrated raw sludge:concentrated excess sludge = 5:3 |

<Simulations for Fluctuation in Amounts of Raw Sludge and/or Excess Sludge Generated>

The amounts of raw sludge and/or excess sludge generated fluctuate in line with the quality of water flowing into a sewage treatment facility. We confirmed that by adjusting the concentration of the concentrated raw sludge and the concentrated excess sludge, the mixture ratio between the concentrated raw sludge and the concentrated excess sludge in the manner shown in table 3 could be successfully set.

Specifically, for a case when the amount ($V(x)$) of concentrated raw sludge generated was fixed (1000 m³/d), the concentration ($C(x)$) thereof was also fixed (1%), and the amount ($V(y)$) of excess sludge generated and the concentration ($C(y)$) thereof fluctuate, the manner in which to adjust the concentration ($C(x')$) of the concentrated raw sludge and the concentration ($C(y')$) of the concentrated excess sludge so that the mixture ratio between the concentrated raw sludge and the concentrated excess sludge would reach 9:3 was confirmed in a case where, e.g., the temperature to which the concentrated excess sludge was heated was 80° C. Examples of the adjustments to the concentrations were shown in table 4 below.

TABLE 4

|  |  | Example 1 | Example 2 | Example 3 |
|---|---|---|---|---|
| Raw sludge | $V(x)$ [m³/d] | 1000 | 1000 | 1500 |
|  | $C(x)$ [gSS/m³] (Concentration %) | 10000 (1%) | 10000 (1%) | 10000 (1%) |
|  | $V(x) \times C(x)$ [kgSS/d] | 10000 | 10000 | 10000 |
| Concentrated raw sludge | $V(x')$ [m³/d] | 345 | 345 | 345 |
|  | $C(x')$ [gSS/m³] (Concentration %) | 28986 (2.9%) | 28986 (2.9%) | 43478 (4.3%) |
|  | $V(x') \times C(x')$ [kgSS/d] | 10000 | 10000 | 15000 |
| Excess sludge | $V(y)$ [m³/d] | 1500 | 1000 | 1000 |
|  | $C(y)$ [gSS/m³] (Concentration %) | 6000 (0.6%) | 6000 (0.6%) | 6000 (0.6%) |
|  | $V(y) \times C(y)$ [kgSS/d] | 9000 | 6000 | 6000 |

TABLE 4-continued

|  |  | Example 1 | Example 2 | Example 3 |
|---|---|---|---|---|
| Concentrated excess sludge | V(y') [m³/d] | 115 | 115 | 115 |
|  | C(y') [gSS/m³] (Concentration %) | 78261 (7.8%) | 52174 (5.2%) | 52174 (5.2%) |
|  | V(y') × C(y') [kgSS/d] | 9000 | 6000 | 6000 |
|  | Heating temperature (° C.) | 80 | 80 | 80 |
| Mixed sludge | V(x') + V(y') [m³/d] | 460 | 460 | 460 |
|  | [gSS/m³] (Concentration %) | 41304 (4.1%) | 34783 (3.5%) | 45652 (4.6%) |
|  | V(x') × C(x') + V(y') × C(y') | 19000 | 16000 | 21000 |

As shown in table 4, we confirmed that by adjusting the concentrated raw sludge to 2.9% and the concentrated excess sludge to 7.8% in example 1, adjusting the concentrated raw sludge to 2.9% and the concentrated excess sludge to 5.2% in example 2, and adjusting the concentrated raw sludge to 4.3% and the concentrated excess sludge to 5.2% in example 3, the mixture ratio between the concentrated raw sludge and the concentrated excess sludge could be successfully set to 9:3.

EXPLANATION OF NUMERALS AND CHARACTERS

10: Raw sludge removal tank
15: Raw sludge concentrator
20: Biological treatment tank
25: Sludge separation tank
30: Excess sludge concentrator
35: Sludge mixing tank
40: Methane fermentation tank
41: Carrier
50: Heating/sterilization device
55: Control device
L1-L10, L12, L13: Pipe

The invention claimed is:

1. A method for treating organic wastewater, comprising
a raw sludge removal step for removing raw sludge from organic wastewater,
a raw sludge concentration step for concentrating the raw sludge removed from the organic wastewater to a prescribed concentration to obtain concentrated raw sludge,
a biological treatment step for biologically treating the organic wastewater from which the raw sludge was removed,
an excess sludge separation step for separating excess sludge from the biologically treated organic wastewater,
an excess sludge concentration step for concentrating the separated excess sludge to a prescribed concentration to obtain concentrated excess sludge,
a sludge mixing step for mixing the concentrated raw sludge and the concentrated excess sludge to obtain mixed sludge, and
a methane fermentation treatment step for supplying the mixed sludge to a methane fermentation tank and performing a methane fermentation treatment,
wherein the method for treating organic wastewater is characterized by further comprising
a sterilization step for heating and sterilizing the concentrated excess sludge incorporated upstream of the sludge mixing step; and
a control step for controlling the mixed sludge at a temperature adaptable to methane fermentation by adjusting at least one among (1) the temperature to which the concentrated excess sludge is heated in the sterilization step, (2) the concentration of the concentrated raw sludge in the raw sludge concentration step and/or the concentration of the concentrated excess sludge in the excess sludge concentration step, and (3) the mixture ratio between the concentrated raw sludge and the concentrated excess sludge in the sludge mixing step according to the fluctuations in the amount of raw sludge generated and the amount of the excess sludge generated.

2. The method for treating organic wastewater according to claim 1, wherein the control step comprises a step S1 setting the temperature to which the concentrated excess sludge is heated in the sterilization step at a temperature within a prescribed range feasible for sterilization, a step S2 setting the mixture ratio between the concentrated raw sludge and the concentrated excess sludge so that the temperature of the mixed sludge reaches a prescribed temperature adaptable to methane fermentation, and a step S3 adjusting the concentration of the concentrated raw sludge concentrated in the raw sludge concentration step and/or the concentration of the concentrated excess sludge concentrated in the excess sludge concentration step within a range(s) according to the fluctuations in the amount of raw sludge generated and the amount of excess sludge generated, so that the mixture ratio between the concentrated raw sludge and the concentrated excess sludge reaches the mixture ratio set in the step S2.

3. The method for treating organic wastewater according to claim 2, wherein, when the adjustment of concentration(s) in the step S3 fail(s) to achieve within the range(s) adjustable in accordance with the concentration of the concentrated raw sludge and/or the concentration of the concentrated excess sludge, the adjustment of concentration(s) in the step S3 is/are executed by adjusting concentration(s) approaching a value determined within the range(s) in which adjustments are possible.

4. The method for treating organic wastewater according to claim 2, wherein, when the adjustment of concentration(s) in the step S3 fail(s) to achieve within the range(s) adjustable in accordance with the concentration of the concentrated raw sludge and/or the concentration of the concentrated excess sludge, the adjustment of concentration(s) in the step S3 is/are executed by changing the temperature setting in the step S1 to which the concentrated excess sludge is heated within a range feasible for sterilization, and by resetting the mixture ratio between the concentrated raw sludge and the concentrated excess sludge in the step S2 in accompaniment with the change in the heating temperature, thereby making it possible to adjust the concentration(s) in the step S3.

5. The method for treating organic wastewater according to claim 1, wherein the control step comprises:
- a step S21 determining the mixture ratio between the concentrated raw sludge and the concentrated excess sludge on the fluctuations in the amount of raw sludge generated and the amount of the excess sludge generated; and
- a step S22 adjusting the temperature to which the concentrated excess sludge is heated in accordance with the mixture ratio determined in the step S21 so that the temperature of the mixed sludge reaches a prescribed temperature adaptable to methane fermentation.

6. The method for treating organic wastewater according to claim 5, wherein, when the adjustment of heating temperature in the concentrated excess sludge in the step S22 fails to achieve, the adjustment of heating temperature for the concentrated excess sludge in the step S22 is executed by changing the concentration of the concentrated raw sludge concentrated in the raw sludge concentration step and/or the concentration of the concentrated excess sludge concentrated in the excess sludge concentration step so as to change the mixture ratio determined between the concentrated raw sludge and the concentrated excess sludge in the step S21, thereby making it possible to adjust the temperature to which the concentrated excess sludge is heated.

7. The method for treating organic wastewater according to claim 1, wherein the temperature to which the concentrated excess sludge is heated in the sterilization step is set within a range of 60-160° C.

8. The method for treating organic wastewater according to claim 1, wherein the temperature to which the concentrated excess sludge is heated in the sterilization step is set at a temperature of averagely 80° C. or higher while partly within 90-100° C.

9. The method for treating organic wastewater according to claim 1, wherein the temperature of the mixed sludge is of 30-40° C., adaptable to mesophilic fermentation.

10. A device for treating organic wastewater, the device comprising
- raw sludge removal means for removing raw sludge from organic wastewater,
- raw sludge concentration means for concentrating the raw sludge removed from the organic wastewater to a prescribed concentration to obtain concentrated raw sludge,
- a biological treatment tank for biologically treating the organic wastewater from which the raw sludge was removed,
- excess sludge separation means for separating excess sludge from the biologically treated organic wastewater,
- excess sludge concentration means for concentrating the separated excess sludge to a prescribed concentration to obtain concentrated excess sludge,
- a sludge mixing tank for mixing the concentrated raw sludge and the concentrated excess sludge to obtain mixed sludge, and
- a methane fermentation tank for performing a methane fermentation treatment on the mixed sludge,
- wherein the device for treating organic wastewater is characterized by comprising:
- a heating/sterilization device for heating and sterilizing the concentrated excess sludge retrieved from the excess sludge concentration means; and
- a control device for controlling the mixed sludge at a temperature adaptable to methane fermentation by adjusting at least one among (1) the temperature to which the concentrated excess sludge is heated in a sterilization step achieved by the heating/sterilization device, (2) the concentration of the concentrated raw sludge in a raw sludge concentration step achieved by the raw sludge concentration means and/or the concentration of the concentrated excess sludge in an excess sludge concentration step achieved by the excess sludge concentration means, and (3) the mixture ratio between the concentrated raw sludge and the concentrated excess sludge in a sludge mixing step achieved in the sludge mixing tank according to the fluctuations in the amount of raw sludge generated and the amount of the excess sludge generated.

* * * * *